United States Patent [19]

Kolcio et al.

[11] Patent Number: 4,628,145
[45] Date of Patent: Dec. 9, 1986

[54] PROTECTIVE COVER FOR ELECTRICAL CONDUCTORS

[76] Inventors: Nestor Kolcio, 11500 Jerome Rd., Plain City, Ohio 43064; Richard A. Peszlen, 5675 Lindenwood Rd., Columbus, Ohio 43229

[21] Appl. No.: 800,752
[22] Filed: Nov. 22, 1985
[51] Int. Cl.[4] .................. H02G 1/02; H01B 17/58
[52] U.S. Cl. .............................. 174/5 R; 174/139
[58] Field of Search ........... 174/5 R, 127, 136, 138 F, 174/139, 140 R, 167, 68 C, 95, 97; 191/35

[56] References Cited

U.S. PATENT DOCUMENTS

| 2,770,667 | 11/1956 | Runde | 174/5 R |
| 2,871,282 | 1/1959 | Tipsord et al. | 174/5 R |
| 3,835,238 | 9/1974 | West | 174/5 R |

FOREIGN PATENT DOCUMENTS

| 2442220 | 3/1975 | Fed. Rep. of Germany | 174/138 F |
| 104854 | 6/1942 | Sweden | 174/139 |

OTHER PUBLICATIONS

Kearney Cover-Up Equipment; published Jun. 1974, Section 18.3—pp. 3-5, Line Guards and Couplers.
A. B. Chance Co. Catalogue; pp. 7G-4 through 7G-7; Chance Conductor and Insulator Covers.
Salisbury catalogue; pp. 76 and 77; Plastic Line Guards.
Bodendieck Tool Division; Apr. 1972, pp. 3-4 through 3-7; Line Guard/Pin Covers.

Primary Examiner—Laramie E. Askin
Attorney, Agent, or Firm—Sand & Hudak Co.

[57] ABSTRACT

An improved protective cover adapted to be suspended on an energized electrical conductor or insulator to protect workmen in the vicinity of the conductor. In one embodiment, the cover is an elongated tubular-shaped member formed by concentrically arranged inner and outer housings maintained in a spaced relationship by a plurality of spacers which provide and maintain an insulating air gap therebetween. A central sleeve is concentrically mounted within the inner housing and together with portions of the inner and outer housings forms a spiral passageway for suspending the cover on a conductor by engagement of the conductor with an inner concave surface of the central sleeve. The inner concave surface of the central sleeve is covered with a conductive material which reduces the strength of the electrical field stress surrounding the energized conductor. The longitudinal sides of the central sleeve are a pair of spaced vertical walls which position the conductor therebetween for suspension engagement with the concave surface of the sleeve. The housings and sleeve have a common longitudinal axis and are formed of a relatively stiff dielectric material. In another embodiment, the cover is formed by a pair of spaced inverted U-shaped dielectric members with the conductive material being provided on an inner concave surface of the inner member.

17 Claims, 11 Drawing Figures

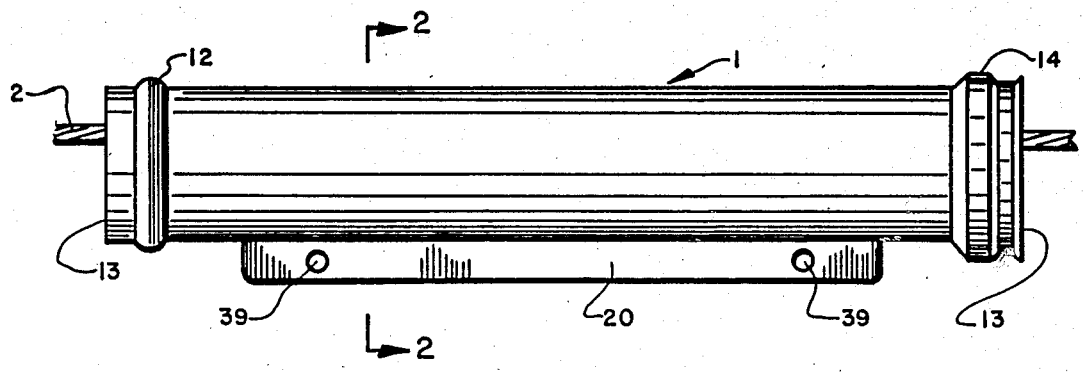
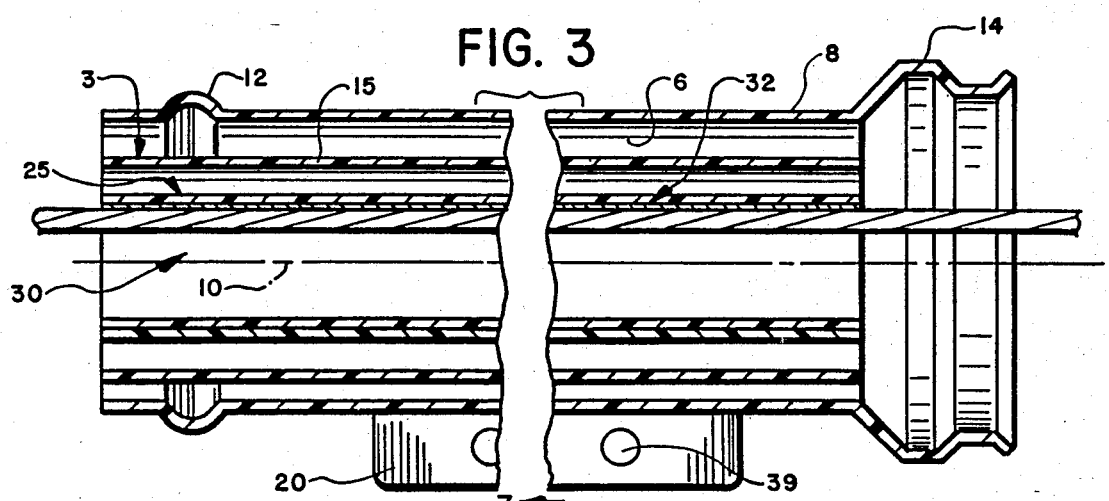
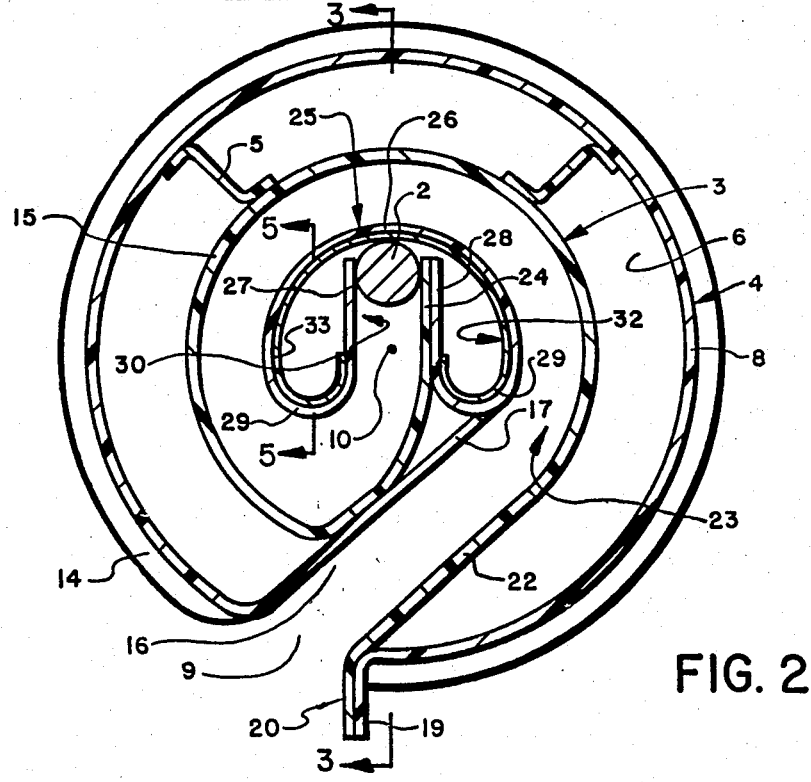

PROTECTIVE COVER FOR ELECTRICAL CONDUCTORS

TECHNICAL FIELD

The invention relates to devices for protecting linemen or other workmen from accidental contact with energized electrical conductors or equipment when working in proximity of the conductor or equipment. More particularly, the invention relates to a protective cover which encloses an energized conductor to provide insulation thereto, in which the interior of the protective cover has an insulating sleeve provided with an electrically conductive surface which reduces the field strength in the vicinity of the conductor and the behavior of the electric field within the protective cover.

BACKGROUND ART

Protective covers commonly referred to as "line guards" have been used by workmen working in an environment close to energized electrical conductors to cover adjacent conductors and associated hardware such as insulators on which the conductors are mounted to prevent the linemen or equipment from accidentally contacting the energized conductor causing hazardous shock and possibly death to the linemen. These prior and existing protective covers usually are formed of a relatively stiff dielectric material such as fiberglass and certain types of plastics. The covers are placed by various insulated devices in a suspended position on the conductor, insulator or the like while the workmen are in the vicinity of the conductor.

One common type of protective cover is an elongated tube having a spiral passageway extending from the exterior of the tube to a central space within the tube which assists in suspending the cover on a conductor to prevent it from blowing or being knocked off the line. Several examples of prior art conductive covers are shown in U.S. Pat. Nos. 2,770,667; 2,871,282; and 3,835,238. Other protective covers are placed over the insulator or cross arm on which the conductor is supported.

Although these prior protective covers perform satisfactorily for their intended purpose, it is desirable that the level of insulation protection be increased without increasing the size and weight of the cover. It is difficult for workmen to satisfactorily handle large diameter and heavy protective covers due to the need to handle the same at the end of the insulated rods or the like. Also, large covers are a problem due to the wind loads exerted thereon when suspended on an energized conductor or insulator. Existing covers for high voltage lines, for example 69,000 volts lines, do not provide adequate phase to phase protection due to the extremely large size that would be required to provide the insulating air space necessary to resist the electrical field stresses exerted about the conductor. Therefore, although existing conductor and insulator covers are satisfactory for many applications, it is preferable to provide a protective cover having increased insulation protection for the linemen without materially increasing the size and weight of the cover.

Another problem with certain of the existing protective covers which have a spiral passageway formed by spaced inner and outer walls is that when pressure is exerted against the outer wall or housing it can reduce the width of the insulating air space between the two housings or sleeves. This reduction seriously affects the level of insulation provided thereby possibly resulting in a flash-over of the conductor to a piece of equipment or workman contacting the outer housing of the protective cover.

Therefore, the need has existed for an improved protective cover for energized conductors, insulators or other such equipment which provides increased insulation and safety to a workman without materially increasing the size and weight of the cover.

SUMMARY OF THE INVENTION

Objectives of the invention include providing an improved protective cover for electrical conductors, insulators, etc. which provides increased insulation yet is similar in size and configuration to existing protective covers thereby enabling workmen familiar with such covers to use the same without requiring any additional training or readjustment due to different operating procedures. Another objective is to provide such a protective cover having an elongated shape formed by a pair of housings of a relatively stiff insulating dielectric material which are maintained in a predetermined spaced relationship from each other by a plurality of spacers to provide a relatively rigid member which will maintain the insulating air gap formed therebetween and prevent it from collapsing upon contact with equipment or a workman.

A still further objective of the invention is to provide such an improved protective cover having a central sleeve which extends throughout the longitudinal length of a pair of spaced outer housings, which sleeve has a concave surface with an open bottom that is connected by a spiral passageway to a longitudinal open end of the housings for receiving and suspending the cover from a conductor; and in which the spiral passageway prevents the cover from being accidentally knocked off or blown from a conductor after being placed thereon by a workman. Another objective is to provide such a protective cover which has a bottom flange for grasping by an insulated rod or similar tool for replacing the cover on an energized conductor from a safe distance.

A still further objective of the invention is to provide such an improved protective cover in which the conductor engaging central sleeve portion of the cover is provided with a conductive surface which is placed in contact with the conductor to reduce the electrical field strength within the cover to provide a surface electrical gradient much less than what the energized conductor would have by itself, and in which the sizing and dimensioning of the inner conductive surface with respect to the outer insulating surfaces of a pair of concentric outer housings can reduce the electrical stresses and behavior of the electric field within the concentric housings to provide increased insulation without increasing the size and weight of the protective cover. Another objective of the invention is to provide such an improved protective cover in which the conductive inner concave surface of the central sleeve is concentrically located within the pair of outer concentric housings and forms part of a spiral passageway for locating the conductor within the central space of the sleeve; in which the concave surface of the central sleeve has a semi-circular portion which terminates in a pair of vertically spaced end walls which trap the conductor therebetween when the cover is suspended on the conductor;

and in which the end walls are connected by a pair of curved portions which also have a conductive coating surface applied thereto to effectively surround the conductor with the conductive surface to achieve the increased insulating effect.

Another objective of the invention is to provide an improved protective cover formed by inner and outer insulating surfaces which are maintained in a spaced relationship by reinforcing spacers, in which a conductive surface is formed on or adjacent to the inner insulating surface for contact with the electrical conductor, and in which the cover can be mounted directly on the conductor separate from any supporting hardware or can be used as an insulator cover or the like.

Another objective of the invention is to provide such a protective cover in which the inner conductive surface of the central sleeve can be a fine metal mesh material, a lightweight metal foil, a conductive paint or metallic coating which is applied to a concave surface of the central sleeve, a non-metallic conductive material such as a resistive coating composed of carbon or similar types of conductive materials, all of which provide the conductivity without materially increasing the weight and size of the protective cover. A further objective is to provide such an improved protective cover which achieves the desired results in a simple, effective, and efficient manner, which is sturdy and durable in use, and which provides increased electrical insulation for the safety of the lineman without increasing the size and weight of the cover.

These objectives and advantages are obtained by the improved protective cover for energized electrical conductors the general nature of which may be stated as including: an elongated member formed by inner and outer housings of dielectric material forming an insulating air gap therebetween; spacer means extending between the housings for maintaining the air gap therebetween; and conductive means provided on an inner surface of the inner housing and extending generally throughout the length of said inner housing and adapted to contact the energized conductor for reducing the electrical field strength in the vicinity of the energized conductor.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

FIG. 1 is a side elevational view of one form of the improved protective cover suspended from an energized electrical conductor;

FIG. 2 is an enlarged fragmentary sectional view of the improved protective cover of FIG. 1, taken on line 2—2, FIG. 1;

FIG. 3 is an enlarged fragmentary sectional view taken on line 3—3, FIG. 2;

Similar numerals refer to similar parts throughout the drawings.

BEST MODE FOR CARRYING OUT THE INVENTION

Figure 4:
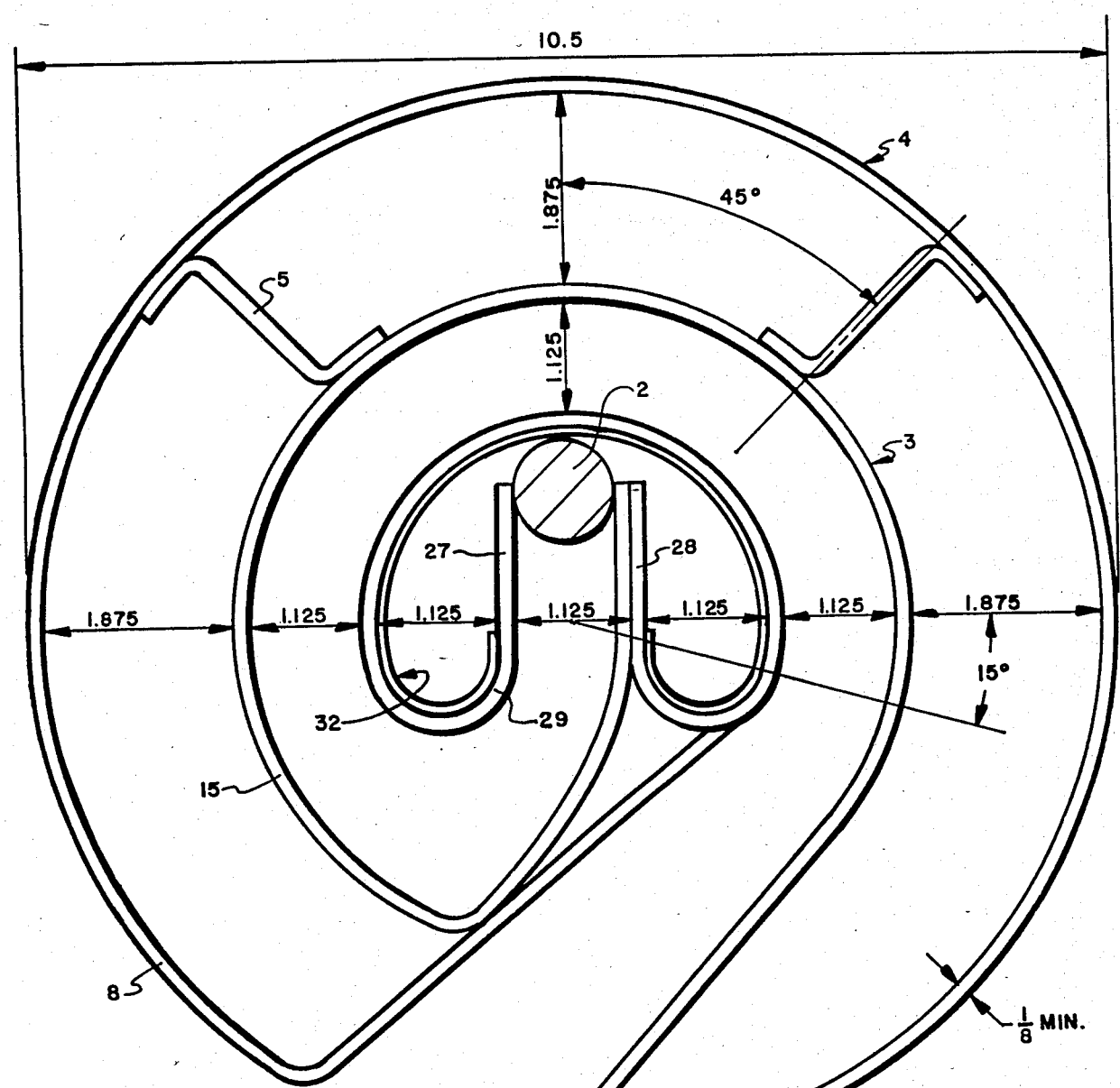
FIG. 4 is an enlarged end view of the improved protective cover similar to FIG. 2 showing the preferred dimensions for a 69,000 volt application.

One form of the improved protective cover is indicated generally at 1, and is shown in FIG. 1 suspended on a usual electrical conductor 2. Protective cover 1 is an elongated tubular-shaped member having inner and outer concentrically mounted housings indicated generally at 3 and 4, respectively, which are formed of relatively stiff dielectric material. Housings 3 and 4 are maintained in a concentric spaced relationship by a plurality of spacers 5 which are placed at selected locations between the housings within an annular-shaped insulating air gap 6 formed between the housings. Spacers 5 also are formed of a dielectric material and have sufficient rigidity to prevent outer housing 4 from being collapsed towards inner housing 3 should protective cover 1 come into contact with a piece of equipment or be pressed against by a workman. Spacers 5 prevent insulating air gap 6 from decreasing in size which would result in reducing the level of insulation provided by cover 1.

Outer housing 4 is generally circular-shaped in cross section as shown in FIG. 2, and is formed by a cylindrical wall 8 having a longitudinally extending open side 9 formed at the bottom of the housing with its longitudinal axis being indicated at 10. A pair of male 12 and female 14 coupling members may be formed on outer wall 8 adjacent the open ends 13 thereof to provide additional stiffening to the protective cover and to provide a means of joining a pair of adjacent covers in an axial relationship should a particular installation require a longer protective cover.

Inner housing 3 also is generally circular-shaped in cross section formed by a generally cylindrical-shaped wall 15 having a bottom open side 16 which coincides with open side 9 of outer housing wall 8. The open side 9 of outer housing 4 is formed by a wall 17 which extends in a cord-like fashion across a portion of the cylindrical interior of housing 4 formed by wall 8 and by another flange or edge portion 19 which extends in a radial outward direction from wall 8. Flange 19 mates with a similar side edge portion or flange 20 which extends radially outwardly from cylindrical wall 15 of inner housing 3. Inner housing 3 also includes a straight wall section 22 which extends in a cord-like fashion across a portion of the protective cover in a generally parallel relationship with outer housing wall 17. Walls 17 and 22 form a portion of a spiral passageway indicated generally at 23, which extends from the exterior of the tubular-shaped member to within a central space 30 formed within the interior of cover 1 as described below. The outer side edge of inner housing 3, indicated at 24, terminates in an upwardly curved portion as shown particularly in FIG. 2.

A central sleeve, indicated generally at 25, is mounted concentrically within housings 3 and 4 sharing a common longitudinal axis 10 with the pair of housings. Central sleeve 25 includes a semicircular shaped portion 26 which terminates in a pair of vertically upwardly extending, parallel spaced walls 27 and 28 joined to portion 26 by generally U-shaped or curved portions 29. Central sleeve 25 forms central space 30 which is located concentrically within and surrounded by spiral passageway 23 and air gap 6. Central sleeve 25 is supported within inner housing 3 by connection of vertical wall 28 with side edge 24 of housing 3.

Air gap 6 has a generally annular configuration and extends throughout an arcuate length approaching 360 degrees except for the space occupied by spiral passageway 23. The ends of air gap 6 are closed by portions of walls 17 and 22 of outer and inner housings 4 and 3, respectively.

Figures 5, 6, 7:
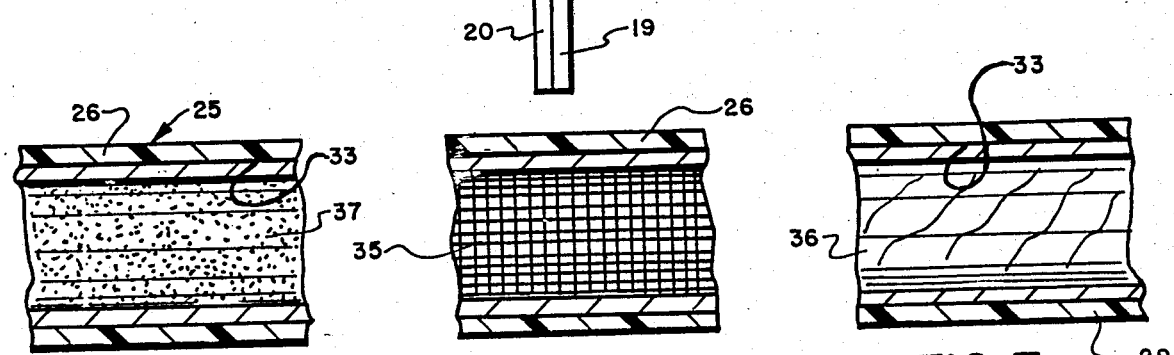
FIG. 5 is an enlarged fragmentary sectional view taken on line 5—5, FIG. 2, showing the conductive surface being formed of a metallic coating.
FIG. 6 is an enlarged fragmentary sectional view similar to FIG. 5, showing the conductive surface being formed of a fine metallic mesh.
FIG. 7 is an enlarged fragmentary sectional view similar to FIGS. 5 and 6, showing the conductive surface being formed of a metal foil.

In accordance with one of the main features of the invention, an electrically conductive surface, indicated generally at 32, covers an inner concave surface 33 formed by semi-cylindrical portion 26 of central sleeve 25 and extend throughout the longitudinal length of the sleeve. Conductive surface 32 also extends about the concave surfaces formed by U-shaped portions 29 of sleeve 25 and extends partially along the inside surfaces of vertical walls 27 and 28 (FIG. 2). Conductive surface 32 can be formed of various types of materials without affecting the concept of the invention. For example, the conductive surface may be formed of a fine wire mesh 35 (FIG. 6), a lightweight metal foil 36 (FIG. 7), or a metallic coating 37 (FIG. 5) which is sprayed or painted on the surface of sleeve 25 or deposited by other means as shown in FIGS. 3 and 5. The conductive surface also may be formed of a non-metallic conductive material such as a resistive coating composed of carbon. Any of these materials or materials similar thereto will provide the desired conductive characteristics without materially increasing the weight of protective cover 1.

As shown in FIG. 2, spiral passageway 23 has an exterior opening formed by cord-like walls 17 and 22 of housings 3 and 4 and is formed and defined by the curved surfaces of inner housing 3 and of central sleeve 25. The width of the passageway 23 will be larger than the diameter of conductor 2 to be covered thereby enabling the conductor to move through the passageway and into central space 30 between walls 27 and 28. Also, when cover 1 is suspended from a conductor 2 as shown in FIG. 2, it will be located above longitudinal common axis 10. In this overcenter position the weight of the cover will enable it to be maintained in the suspended position on the conductor and not easily dislodged due to wind force or other external forces acting thereon.

Preferably, central sleeve 25 is a one-piece integral member comprising the above-described semicylindrical portion 26 and vertical walls 27 and 28 connected by curved generally U-shaped portions 29. Central sleeve 25 also will be formed of relatively stiff insulating material similar to the walls of housings 3 and 4. The closed uppermost portion of concave surface 33 of sleeve 25 forms a seat for suspending the cover on conductor 2. A pair of holes 39 preferably are formed in flange edges 19 and 20 of housings 4 and 3, respectively, for receiving the end of an insulated rod or similar equipment therein which enables the protective cover to be suspended on an energized conductor from a safe distance by a lineman as is standard practice with existing line guards or similar protective covers and apparatus.

FIG. 4 shows one particular form of the improved protective cover and the particular dimensions thereof intended primarily for use on 69,000 volt electric lines. The particular dimensions shown in FIG. 4 will vary depending upon the voltage with which improved protective cover 1 is intended for use and the amount of insulation protection to be provided thereby. Improved protective cover 1 provides a device wherein conductive surface 32 is used to reduce the electrical stresses within the protective cover by placing the conductive surface in contact with the energized conductor shielded within central sleeve 25. This provides a surface electric gradient much less than that which the line conductor would have by itself.

By varying the dimensions of the inner conducting surface with respect to the inner and outer housings 3 and 4, the electrical strength of the space between the line conductor and an object at another potential such as ground, at the outer surface of housing 4, can be made to withstand a certain maximum voltage. This is accomplished by keeping the gradient of inner conductive surface 32 below the ionization potential of air about the outer surface of central sleeve 25 when subjected to a maximum design voltage. The application of conductive surface 32 to reduce the electric stresses and behavior of the electric field within the concentric housings is one of the main features of the improved configuration of protective cover 1. Improved protective cover 1 also provides a large air gap by means of air gap 6 combined with spiral passageway 23 and controls the field stress to minimize ionization of air surrounding conductor 2 by use of conductive surface 32.

Figure 8:
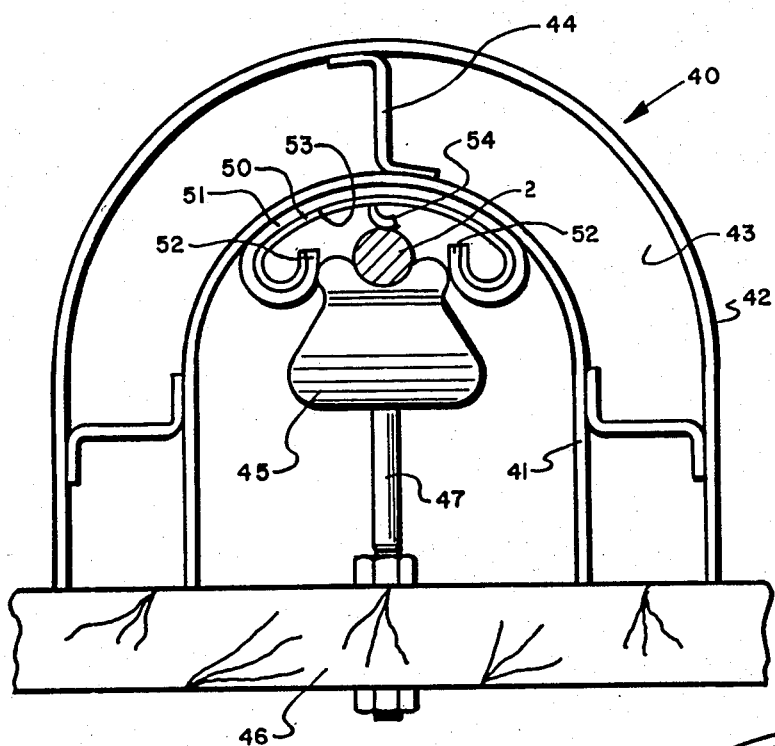
FIG. 8 is a fragmentary end view showing another embodiment of the improved protective cover being used as an insulator cover.

FIG. 8 shows another embodiment of the improved protective cover which is indicated generally at 40, and which is referred to in the electrical industry as an insulator cover. Cover 40 includes elongated inner and outer members having a generally inverted U-shaped cross-sectional configuration formed of a dielectric material and indicated at 41 and 42, respectively. Members 41 and 42 form an intervening insulating air gap 43 which is maintained at a size by a plurality of reinforcing spacers 44. Insulating members 41 and 42 together with reinforcing spacers 44 provide a somewhat similar configuration as that formed by inner and outer housings 3 and 4 and spacers 5 of embodiment 1.

Cover 40 differs from protective cover 1 in that it is not formed with a spiral passageway and is intended primarily for placement on an electrical conductor 2 at the location where the conductor is attached to a usual electrical insulator 45 which is mounted on a cross arm 46 by a mounting bolt 47. In accordance with the invention, a conductive surface 50, which is similar to conductive surface 32 of embodiment 1, is formed on an inner concave surface 53 of a central sleeve 51. Sleeve 51 may be formed as a separate longitudinally extending dielectric member which is attached by an adhesive to inner housing 41 or may be formed as an integral part thereof. Concave surface 53 preferably terminates in a pair of inturned ends 52 which engage the outer ends of insulator 45 to provide a conductive shield for conductor 2. Conductive surface 50 includes an outwardly extending member 54 which extends throughout the length of sleeve 51 to provide an electrical contact between conductor 2 and conductive surface 50 when cover 40 is mounted on insulator 45 as shown in FIG. 8.

Figure 9:
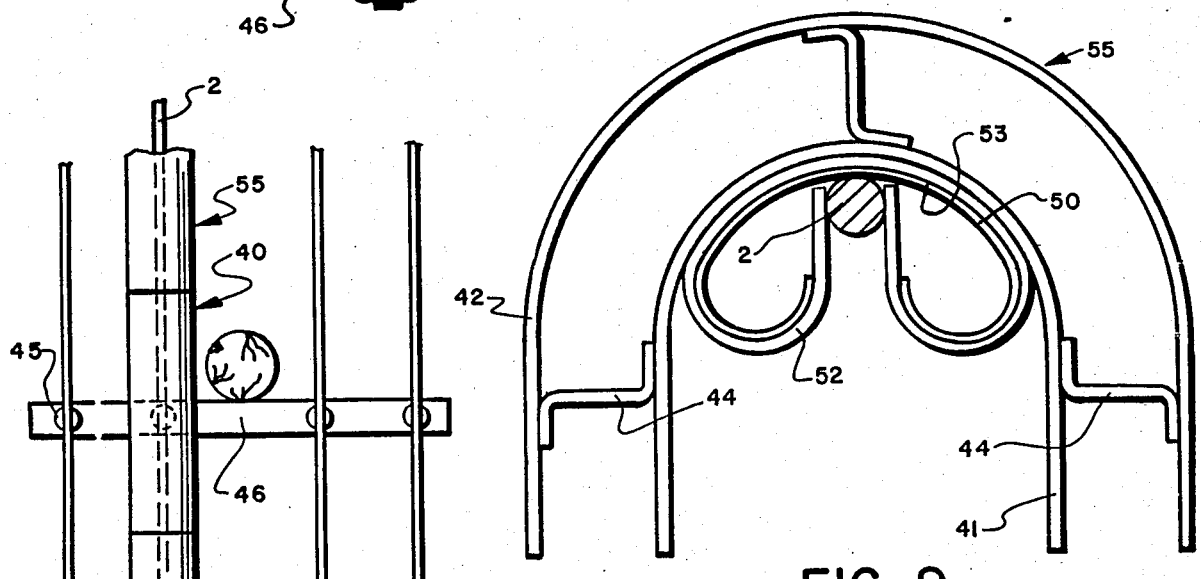
FIG. 9 is an end view showing still another embodiment of the improved protective cover being used as a conductor cover without the internal spiral passageway.
Figure 11:
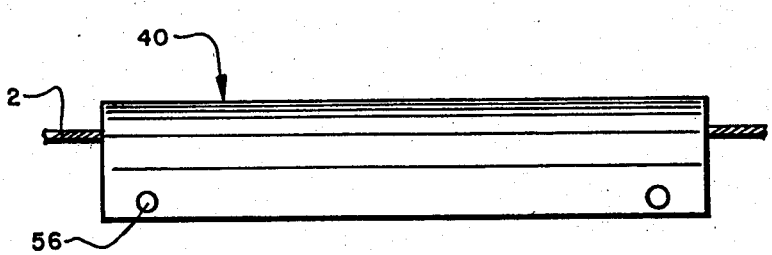
FIG. 11 is a side elevational view of the embodiment of FIG. 9 mounted on a conductor.

A third embodiment of the improved protective cover is indicated generally at 55, and is shown in FIGS. 9 and 11. Cover 55 is similar to protective insulator cover 40 of FIG. 8 except that cover 55 is adapted to be suspended directly on conductor 2 instead of being supported by insulator 45. In this mounted position conductive surface 50 is directly engaging conductor 2 eliminating the need of the connecting conductive member 54.

FIG. 11 shows the longitudinal length and configuration of the inner and outer housings which form modified protective covers 40 and 55 of FIGS. 8 and 9. A pair of holes 56 may be formed in the lower ends of outer housing 42 for mounting the protective covers on the conductor by an insulated rod or similar piece of equipment in the same manner as is protective cover 1 by use of holes 39.

Figure 10:
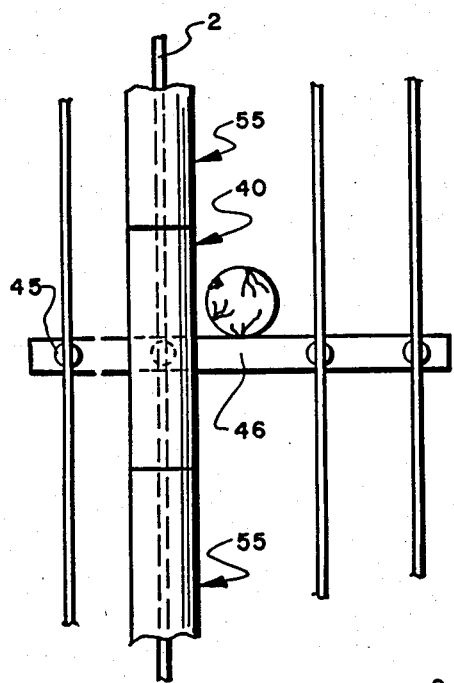
FIG. 10 is a fragmentary top plan view showing the embodiments of FIGS. 8 and 9 mounted on an insulator and conductor at a pole location.

FIG. 10 shows a typical installation in which insulation protective cover 40 is mounted on an insulator 45 with a pair of conductor covers 55 being mounted adjacent thereto on conductor 2. In the mounting arrangement of FIG. 10, insulator covers 55 could be replaced with protective cover 1 if desired. Protective cover embodiments 40 and 55 and their manner of use shown in FIG. 10 are merely illustrative of other forms of the improved protective cover for carrying out the principles of the invention. Both embodiments 40 and 55 include inner and outer insulating surfaces or housings which form a predetermined size insulating air gap therebetween, the size of which is maintained generally constant by reinforcing spacers 44. Conductive surface 50 is formed on an inner concave surface of these two protective covers and engages conductor 2 for reducing the field strength in the vicinity of the conductor. This reduction in field strength provides increased insulation from that provided by similar covers without materially increasing the size and weight of the protective cover.

Again, other configurations of such protective covers can be utilized without affecting the concept of the invention so long as they are provided with the inner conductive surface which is adapted to engage the energized conductor or other piece of electrical hardware or equipment on which the cover is mounted, in combination with the inner and outer spaced insulating housings of dielectric material. Also, as shown in FIGS. 8 and 9, the covers will be suspended on the conductor or insulator at a point above the longitudinal central axis of the protective cover enabling the protective cover to be suspended from the particular conductor or insulator without requiring other means for attaching the cover to the insulator conductor.

Accordingly, improved protective cover 1 provides a device which is extremely rugged and durable in use, which can be accomplished with existing line guards, insulator covers and similar types of protective covering apparatus by providing inner conductive surface 32 on the inner surface of the cover which contacts the electric conductor to effectively reduce the field strength in the vicinity of the conductor.

Accordingly, the improved protective cover is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the means in which the improved protective cover for electrical conductors is constructed and used, the characteristics of the construction, and the advantageous, new and useful results obtained; the new and useful structures, devices, elements, arrangements, parts, and combinations, are set forth in the appended claims.

What is claimed is:

1. An improved protective cover adapted to insulate an energized conductor including:
    (a) an elongated tubular-shaped member formed by inner and outer housings of dielectric material, said housings being generally circular in cross-section and spaced generally concentric with respect to each other forming an air gap therebetween and being open at a lower side;
    (b) spacer means extending between the housings for maintaining the air gap therebetween;
    (c) a central sleeve of dielectric material extending generally throughout the longitudinal length of the inner housing and in cross-section having an upper curved portion with a concave surface forming a central space, with said curved portion terminating in an open lower side;
    (d) a spiral passageway formed by portions of the inner housing and central sleeve extending from the open lower side of the inner and outer housings to the central space formed by said central sleeve to admit a conductor from the exterior of the tubular-shaped member to said central space for supporting the protective cover in a suspended position on a conductor; and
    (e) conductive means provided on the concave surface of the central sleeve extending generally throughout the length of said sleeve adapted to contact an energized conductor when the protective cover is suspended on the energized conductor for increasing the electrical insulation in the vicinity of the energized conductor.

2. The protective cover defined in claim 1 in which the central sleeve is generally semicircular terminating in a pair of spaced walls which define the open lower side thereof; in which the spaced side walls of the central sleeve are generally parallel, vertically extending walls; and in which said walls are connected with the semicircular shaped sleeve portion by a pair of U-shaped portions.

3. The protective cover defined in claim 2 in which the central sleeve is a one piece member with the semicircular shaped portion being integrally connected to the U-shaped portions which are integrally connected to the spaced side walls.

4. The protective cover defined in claim 2 in which the spaced side walls of the central sleeve extend upwardly within the central space toward the concave surface of said central sleeve.

5. The protective cover defined in claim 2 in which the conductive means extends throughout and is complementary with the U-shaped portions of the central sleeve; and in which the U-shaped portions and complementary conductive means are generally semicircular in cross section.

6. The protective cover defined in claim 2 in which the inner housing terminates in a pair of longitudinal side edges, one of which is connected to one of the spaced side walls of the central sleeve and the other of which is connected to a longitudinal side edge of the outer housing.

7. The protective cover defined in claim 1 in which flange means depend from the open side of the inner and outer housings for connection to a device for suspending the protective cover on an energized conductor.

8. The protective cover defined in claim 1 in which the spiral passageway has a width greater than the diameter of a conductor to be covered thereby.

9. The protective cover defined in claim 1 in which the air gap formed between the inner and outer housings has an enclosed arcuate configuration in cross section.

10. The protective cover defined in claim 9 in which the air gap is enclosed along its longitudinal sides by portions of the inner and outer housings which extend in a chordal direction from the outer circumference of the tubular-shaped member.

11. The protective cover defined in claim 1 in which the inner and outer housings and central sleeve have a common longitudinal axis; and in which said longitudinal axis will be located below a conductor when the protective cover is suspended by engagement of the conductor with the central sleeve.

12. The protective cover defined in claim 1 in which the conductive means is a metal foil applied to the concave surface of the central sleeve.

13. The protective cover defined in claim 1 in which the conductive means is a metal mesh applied to the concave surface of the central sleeve.

14. The protective cover defined in claim 1 in which the conductive means is a metallic coating applied to the concave surface of the central sleeve.

15. The protective cover defined in claim 1 in which the conductive means is a nonmetallic conductive material formed of a resistive coating of carbon.

16. An improved protective cover adapted to insulate an energized conductor including:
   (a) an elongated member formed by inner and outer housings of dielectric material forming an insulating air gap therebetween, said housings having a generally inverted U-shape in transverse cross section, with said inner housing having a central sleeve of dielectric material extending generally throughout the longitudinal length of said inner housing;
   (b) spacer means extending between the housings for maintaining the air gap therebetween; and
   (c) conductive means provided on an inner surface of the central sleeve and extending generally throughout the length of said sleeve and adapted to contact an energized conductor for increasing the electrical insulation in the vicinity of the energized conductor.

17. The protective cover defined in claim 16 in which the central sleeve terminates in a pair of inturned ends; in which the conductive means is a conductive coating applied to a concave surface of said central sleeve including the inturned ends; and in which the inturned ends are adapted to engage an insulator for mounting the cover on said insulator to increase the electrical insulation in the vicinity of an energized conductor supported by the insulator.

* * * * *